United States Patent [19]

Chuang

[11] Patent Number: 5,265,969
[45] Date of Patent: Nov. 30, 1993

[54] ANGLE-ADJUSTABLE JOINT

[76] Inventor: Ching-Pao Chuang, No. 120-18, Yu Che, Yu Che Li, Ma Tou Chen, Tainan Hsien, Taiwan

[21] Appl. No.: 991,263

[22] Filed: Dec. 16, 1992

[51] Int. Cl.⁵ .............................................. F16C 11/10
[52] U.S. Cl. ...................................... 403/94; 403/93; 403/103; 16/329; 16/331
[58] Field of Search ................. 403/94, 93, 96, 97, 403/103, 104; 16/321, 327, 328, 329, 332

[56] References Cited

U.S. PATENT DOCUMENTS

| | | | |
|---|---|---|---|
| 4,637,091 | 1/1987 | Wu | 403/93 |
| 4,770,559 | 9/1988 | Yoo | 403/93 |
| 4,893,370 | 1/1990 | Klotz | 403/93 |

Primary Examiner—Richard K. Seidel
Assistant Examiner—Erik R. Puknys
Attorney, Agent, or Firm—Morton J. Rosenberg; David I. Klein

[57] ABSTRACT

An angle-adjustable joint consisting of a male joint and a female joint combined together with a pivotal pin, the male joint being rotated in its angle for a wide scope in relating to the female joint and then locked at any angle by a push rod extending in a lateral hole in the female joint and being pushed to locate in a locking position to engage any set of locating teeth around a round end of the male joint, the push rod being pushed most inward to an unlocking position to disengage from the set of locating teeth to free the male joint in relation to the female joint.

1 Claim, 4 Drawing Sheets

ANGLE-ADJUSTABLE JOINT

BACKGROUND OF THE INVENTION

A conventional angle-adjustable joint shown in FIG. 5 used in a collapsible chair has a male joint 11, a female joint 12 and a bolt 13 combined both joints together. This conventional angle-adjustable joint is found to have following disadvantages.

1. Its angle adjustability is limited for 90 in the horizontal and the vertical direction.
2. It can only be secured at two kinds of positions adjustable, not able to be secured at any angle between the two positions.
3. In adjusting process, a user may not have enough force to sustain the weight of the thing to be adjusted in its angle.
4. A variety of different sized joints have to be prepared for different things, for lack of common features.

SUMMARY OF THE INVENTION

This invention has been devised to offer an angle-adjustable joint with following features added.

1. Its angle can be adjusted to a wide scope by rotating a male joint in relation to a female joint, and secured at any angle within the scope.
2. It has a push rod to engage with locating teeth of a male joint, locking the male joint at a position adjusted in its angle to a female joint.
3. Its male joint has a plurality of locating teeth around a round end to offer a plurality of angles to be chosen in relation to the female joint.
4. Locking process by the push rod can be carried out by means of a push plate fixed at an outer end of the push rod elastically pushed by a spring.
5. In case an accident is going to happen in angle adjusting process, a user can at once stop the process, preventing it from happening.
6. Its locking structure has a rather long engaging face to keep any of a plurality of locking positions very secure.
7. Its wide angle adjustability affords it to be applied to a wide variety of objects.

BRIEF DESCRIPTION OF DRAWINGS

The invention will be better understood reference to the accompanying drawings, wherein.

DETAILED DESCRIPTION OF THE INVENTION

Figure 1:
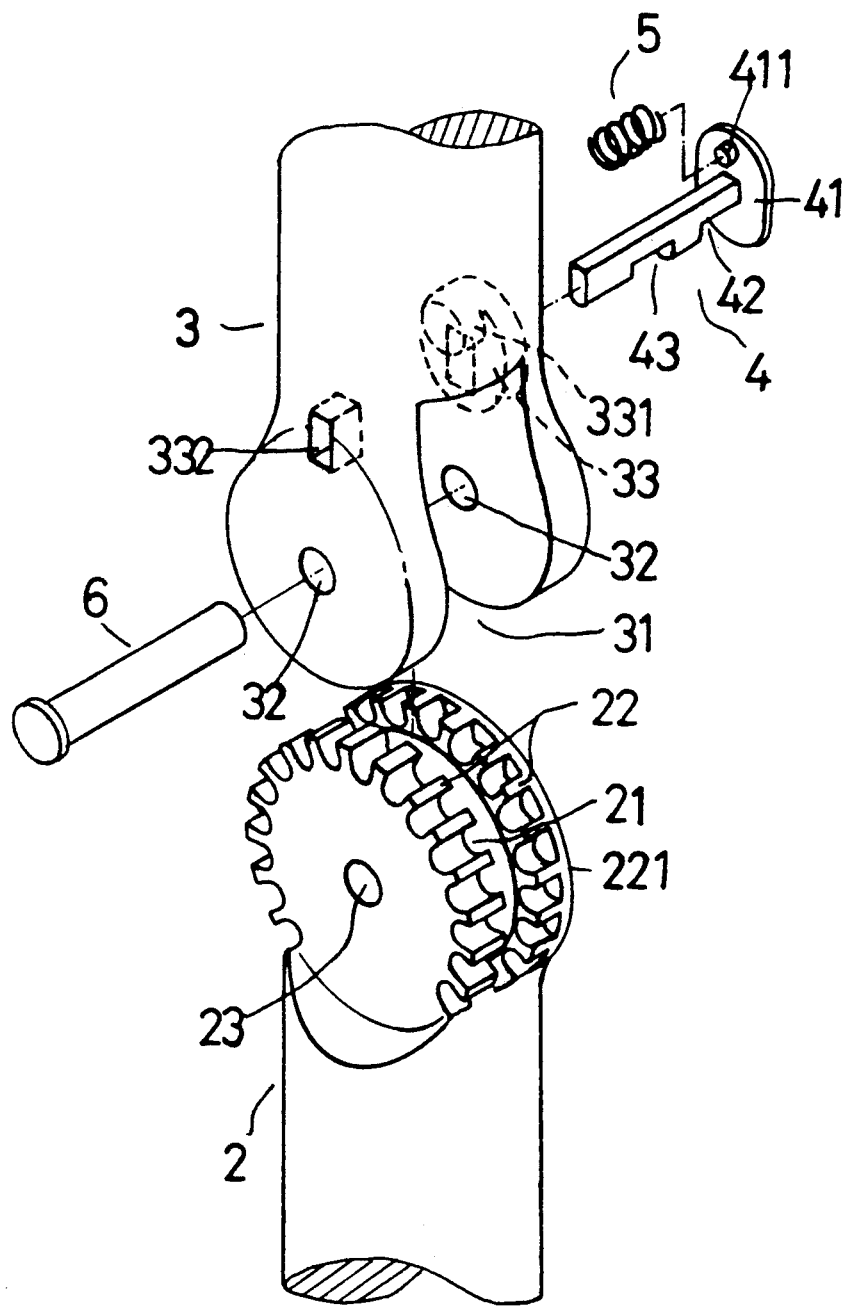
FIG. 1 is an exploded perspective view of an angle-adjustable joint in the present invention.
Figure 2:
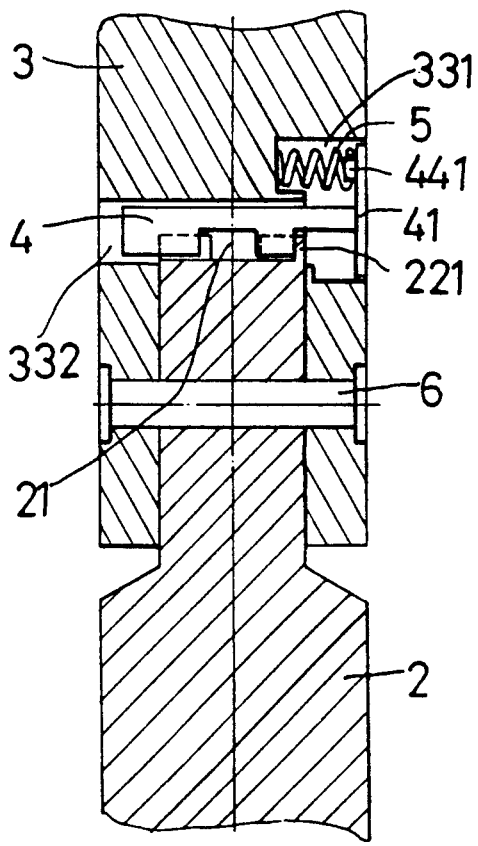
FIG. 2 is a side cross-sectional view of the angle-adjustable joint with a locking member locking a set of teeth of a male joint in the present invention.
Figure 3:
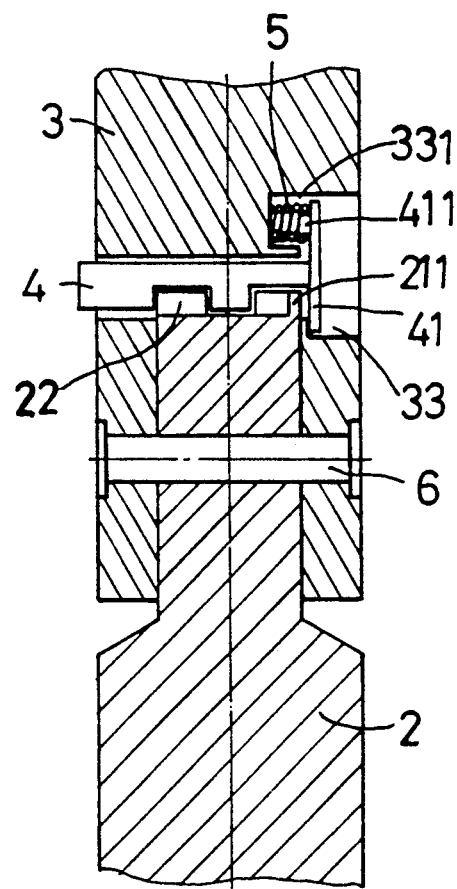
FIG. 3 is a side cross-sectional view of the angle-adjustable joint with the locking member unlocking the set of teeth of the male joint in the present invention.

An angle-adjustable joint in the present invention, as shown in FIGS. 1-3, comprises a male joint 2, a female joint 3, a locking member consisting of a push rod 4 and a spring 5, and a pivotal pin 6.

The male joint 2 has a round end provided with two sets of a plurality of locating teeth 22 and an annular groove 221 between the two sets of teeth 22, a stop wall 221 at one side of the round end, and a central hole 23 for a pivotal pin 6 to pass through. The other end of the male joint 2 is to be connected with a rod or a bar.

The female joint 3 has a forked round end with an intermediate opening 31, a central hole for the pivotal pin 6 to pass through to combine the female joint 32 with the male joint 2, a lateral hole 33 in a vertical side and a rectangular hole 332 in the other vertical side in line with the lateral hole 331 for the push rod 4 to extend therein. The other end of the female joint 3 is to be connected with a rod or a bar.

The push rod 4 has a push plate 41 fixed at its outer end, and a projection 41 provided to extend sidewise from an inner wall of the push plate 41 for a spring 5 to fit around and rest on the inner wall. The push rod 4 is shaped as the rectangular hole 332 in its cross-section so as to fit therein, and has two notches 42, 43 spaced apart in a lower side for the teeth of the male joint 2 to fit with.

Figure 4:
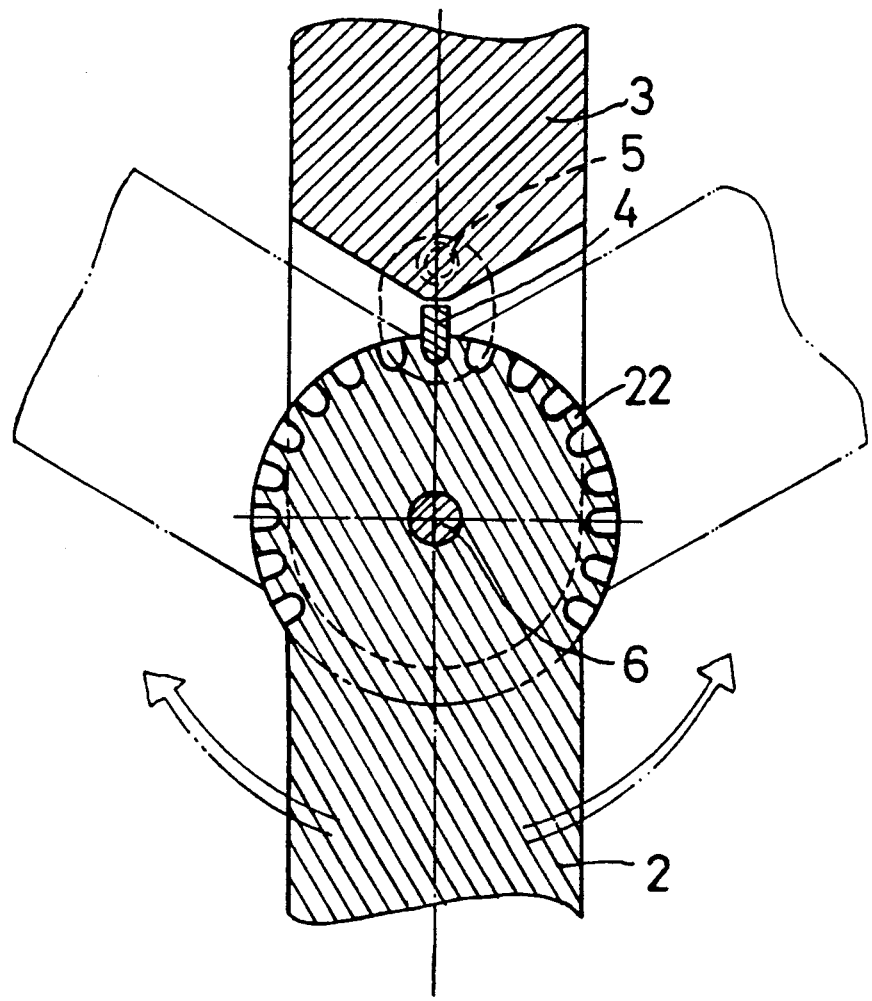
FIG. 4 is a front cross-sectional view of the angle-adjustable joint, showing how the male joint is to be moved for adjusting in the present invention; and, FIG. 5 is an exploded perspective view of a conventional angle-adjustable joint.
Figure 5:
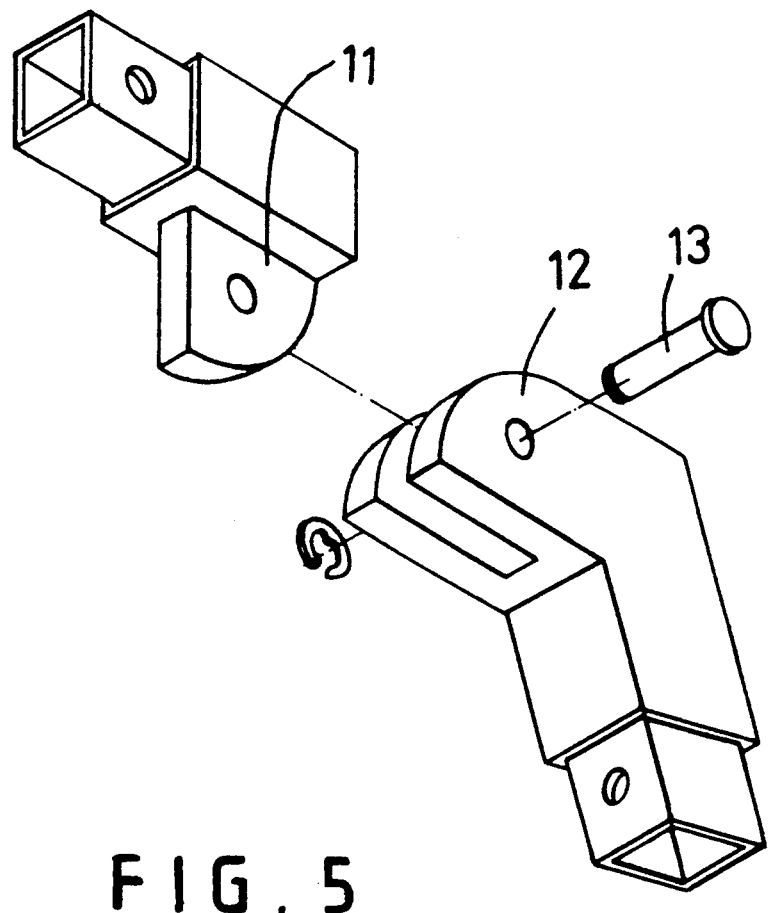

In combining, as shown in FIGS. 2-4, the spring 5 is put around the projection 411 of the push plate 41 and then put through the lateral opening 33, together with the push rod, and finally put in a recess 331 at a bottom of the opening 33. A front end of the push rod 4 fits in the rectangular hole 332. Then the push rod 4 is pressed most inward, and the male joint 2 is inserted in the intermediate opening 31, with the stop wall 221 fitting in the notch 42. Next, the push rod 4 is released to move outward to a locking position shown in FIG. 2 from a position shown in FIG. 3. Finally the pivotal pin 6 is inserted through the pin hole 23 of the male joint 2 and the pin hole 32 of the female joint 3 to combine both joints 2, 3 together as a pivot.

After this joint is assembled together, the push rod 4 can be located in a locking position as shown in FIG. 2, between two neighboring teeth 22 and stops the male joint 2 immovable in a position at an angle to the female joint 3. If the push rod 4 is pressed most inward to an unlocking position shown in FIG. 3 from the locking position shown in FIG. 2, the two notches 42, 43 comes to lie just on one set of the teeth 22, enabling the male joint 2 to rotate in relation to the female joint 3 to a needed angle. Then releasing the push rod 4 can let it move elastically to the locking position shown in FIG. 2 from the unlocking position shown in FIG. 3.

While the preferred embodiments of the invention have been described above, it will be recognized and understood that various modifications may be made therein and the appended claims are intended to cover all such modifications which may fall within the spirit and scope of the invention.

What is claimed is:

1. An angle-adjustable joint comprising;
a male joint having a round end cut with two sets of a plurality of locating teeth and an annular groove separating the two sets of locating teeth, a stop wall at a vertical side abutting the teeth, and a central pin hole;
a female joint having a forked round end with an intermediate opening for the round end of the male joint to fit and rotate therein, a lateral opening in a vertical side, a rectangular hole in the other vertical side in line with the lateral opening, a recess in a bottom of the lateral opening for a spring of a locking member to fit therein, a locking member consisting of (1) a push rod having a push plate fixed at its outer end and two notches spaced apart in its lower side, (2) a spring being adapted to rest on an inner wall of the push plate to fit around a projection on the inner wall and fitted in the recess in the bottom of the lateral opening of the female joint, so as to push elastically the push plate outward;

a pivotal pin being provided to pass through the pin hole in the male and the female joint to combine both joints pivotally together; and said push rod having two positions-one locking and the other unlocking, said push rod in the locking position having its two notches engaging a set of teeth of the male joint and thus locking the male joint unrotatable, said push rod in the unlocking position having its two notches lying on the set of teeth of the male joint and thus unlocking the male in relation to the female joint and thus enabling the male joint rotatable in relation to the female joint, said push rod being able to be pushed most inward elastically in the lateral opening and the rectangular hole of the female joint from the locking position to the unlocking position, and said push rod recovering elastically the locking position from the unlocking position by releasing it.

* * * * *